(12) United States Patent
Raida

(10) Patent No.: US 6,626,041 B2
(45) Date of Patent: Sep. 30, 2003

(54) METHOD FOR DETERMINING SOLID-BORNE AND AIRBORNE PORTIONS OF ENGINE NOISE

(75) Inventor: Hans Joachim Raida, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/065,118

(22) Filed: Sep. 18, 2002

(65) Prior Publication Data

US 2003/0051551 A1 Mar. 20, 2003

(30) Foreign Application Priority Data

Sep. 19, 2001 (DE) .......................... 101 46 121

(51) Int. Cl.$^7$ .............................. G01N 29/00
(52) U.S. Cl. ...................................... 73/587
(58) Field of Search ................ 73/587, 865.6; 181/206; 381/71.1, 71.5

(56) References Cited

U.S. PATENT DOCUMENTS

| | | | | |
|---|---|---|---|---|
| 4,995,659 A | * | 2/1991 | Park .......................... | 293/107 |
| 5,467,747 A | * | 11/1995 | Brandt et al. .............. | 181/294 |
| 5,666,427 A | * | 9/1997 | Kim et al. .................. | 381/71.1 |
| 6,176,125 B1 | * | 1/2001 | Hirano et al. .............. | 73/118.1 |
| 2001/0036282 A1 | * | 11/2001 | Haworth et al. ............ | 181/206 |

FOREIGN PATENT DOCUMENTS

| | | |
|---|---|---|
| DE | 19745954 A1 | 4/1999 |
| FR | 2783498 | 2/1999 |
| FR | 2783499 | 3/2000 |
| GB | 2271387 | 4/1994 |

OTHER PUBLICATIONS

Pfeifer et al., "Moderne Pruftechnik in der BMW Antriebsentwicklung–Drei neue Spezialprufstande", ATZ Automobiltechnische Zeitschrift, vol. 99, 1997, pp. 446–454, Germany.

Hofer et al., "Die Akustik des neuen V6–TDI–Motors im Audi A8", ATZ Automobiltechnische Zeitschrift, vol. 99, 1997, pp. 414–423, Germany.

Fingberg et al., "Gerauschpfadanalyse einmal andaers—Ein neuer Ansatz aus der Praxis—", Mar. 1992, pp. 1–10, Haus der Technik e. V., Essen, Germany.

Profos et al., "Handbuch der industriellen MeBtechnik", R. Oldenbourg Verlag, Nov. 1992, pp. 1194–1200, Chapter 13, "Larmmessung", Munchen, Germany and Wien, Austria.

* cited by examiner

*Primary Examiner*—Hezron Williams
*Assistant Examiner*—Tamiko Bellamy
(74) *Attorney, Agent, or Firm*—Diane D. Brebob

(57) ABSTRACT

Internal combustion engines and electric motors in motor vehicles generate, at all operating points, airborne emissions and solid-borne emissions, which are superimposed in the interior of the vehicle and perceived as engine noise by the occupants. To differentiate quantitatively between airborne and solid-borne portions of engine noise, sound measurement are made in the vehicle interior and engine compartment both with air and when the engine compartment is flooded with a gas having different acoustic characteristics than air. From analysis of the two measurements, the solid-borne portion and the airborne portion of the engine noise can be determined with a high degree of precision.

29 Claims, 1 Drawing Sheet

METHOD FOR DETERMINING SOLID-BORNE AND AIRBORNE PORTIONS OF ENGINE NOISE

BACKGROUND OF THE INVENTION

1. Field of the Invention

The subject matter of the present invention is a method for quantitatively determining the airborne portion and solid-borne portion of engine noise such as can be heard, for example, in the interior of motor vehicles or electric vehicles. By flooding the engine compartment with a gas or gas mixture with a different density than air, the acoustic conditions in the engine compartment are changed. Conclusions about the airborne and solid-borne portions of the engine noise in the interior of the vehicle can be drawn from measurements taken before and after this acoustic change. The method can also be applied to other forms of transportation, such as ships and aircraft, as well as power stations, machine shops, etc.

2. Background of the Invention

To achieve a high level of driving comfort in motor vehicles, a pleasant noise level in the passenger compartment of a vehicle is desirable. This noise level or sound level is determined to a considerable degree by the drive unit, in one example, a reciprocating internal combustion engine. The noise emitted by the engine is usually transmitted into the passenger compartment in two ways: noise transmitted directly into the passenger compartment as airborne sound; and sound emitted by the engine transmitted into the passenger compartment through the engine block to the body of the vehicle as solid-borne sound. To selectively reduce the sound level, it is desirable to separate the portion of solid-borne sound from the portion of airborne sound.

The prior art, with respect to the reduction of noise levels, is directed toward reducing airborne sound level of the engine. Thus, for example a test bench for engine sound measurement from BMW AG is described in detail in ATZp. 446 et seq. (1997).

In the same issue of ATZ, p. 414 et seq., measures for reducing the level of airborne sound by sound damping and measures for reducing the level of solid-borne sound by adjustable hydraulic engine bearings are disclosed using the example of the Audi A8.

The solid-borne and airborne portions of the engine noise, as heard in the interior of the vehicle, can currently be determined only at great cost. Two basic methods are described in a paper "Ger ä uschpfadanalyse einmal anders [A Different Approach to Analyzing Noise Paths]" for the 3$^{rd}$ Vehicle Acoustics Conference "Ger ä uschminderung in Kraftfahrzeugen [Reducing Noise in Motor Vehicles]" of 10/11.3.1992 at the Haus der Technik e.V., Essen. In the first method, the drive train is partially or even completely decoupled from the vehicle so that the noise in the interior of the vehicle is only the airborne portion of the engine noise. However, for this purpose, costly steel frames must be set up for suspending the entire drive train. In particular, the decoupling of the drive shafts is problematic.

In addition, there is an indirect method in which preliminary measurements of the solid-borne and airborne sound transmission functions, known by the name "Transferpfad-Analyse [Noise Path Analysis]", are determined. In addition, engine acceleration and noise emitted by the engine are measured. By superposing the signals, which are linear in large regions, it is possible to draw conclusions about the relative contributions of airborne and solid-borne sound. The precision of the conclusions is, however, frequency-dependent as the solid-borne sound transfer functions are imprecise, in particular at low and high frequencies. At low frequencies, it is not possible to carry out excitation sufficiently because the coherence worsens. At high frequencies, the phase can only be measured imprecisely. In addition, the transfer functions also change with temperature (temperature-dependent elasticity of the rubber bearings) and engine load (tensioning of the engine bearings, for example, full-load accelerations at low rotational speeds).

The precise measurement of the airborne sound emissions of the engine is also problematic. Such measurements are carried out in the acoustic close-range field of the engine, as a result of which the sound pressure between two adjacent points can vary greatly. It is, therefore, impossible in practical terms to pick up the emitted engine noise completely and correctly using measuring equipment. Typically, only one microphone is used on each side of the engine to record the engine noise.

Methods in which acoustic effects are studied using gases with properties other than those of as air are known. To influence the acoustics in aircraft, for example, "lightweight" gases, i.e., gases with low density or a high speed of sound are used. In FR 2783498, it is proposed to cause lightweight gases to flow out at the rotor blades of a jet engine to minimize emission of airborne sound. FR2783499 discloses a method in which the shock waves occurring to the engine inlet and to the front edges of the aircraft airfoils when flying above the speed of sound are reduced by causing a lightweight gas to flow out in a selective way. GB 2271387 describes resonators integrated in an aircraft jet engine, which are filled with a lightweight gas, as a result of which the inherent frequencies of the resonator, and thus the effect of the resonator, are influenced in a selective way. In addition to these methods, which utilize the acoustic properties of low-density gases, methods for quantitatively determining gas properties with acoustic means are also known. Thus, DE 19745954 A1 describes a measuring method in which the composition of gases (for example, for anesthetic applications) is determined acoustically. Here, sound pressure oscillations are generated in the gas mixture to be measured and the propagation speed, the sound pressure amplitude, the frequency changes or other acoustic variables of the gas space are determined and the gas composition derived therefrom.

SUMMARY OF INVENTION

An advantage of the present invention is in providing a simple measuring method with which the airborne portion and solid-borne portion of engine noise can be determined easily in a qualitative and quantitative fashion for any operating point and any frequency.

This is achieved by a measuring method for determining the solid-borne portion and the airborne portion of powerplant noise in the interior of a vehicle, by performing a first sound measurement by at least one microphone in an engine compartment and at least one microphone in the interior of the vehicle, the microphones being connected to at least one amplifier and evaluation unit. A gas other than air is introduced into the engine compartment of the vehicle. A second sound measurement is performed when the gas, other than air is in the engine compartment. The first and second sound measurements are compared.

According to the invention, the entire engine compartment or parts thereof is flooded with a gas or gas mixture, which has a density or speed of sound, which is significantly different from that of air. In addition, this gas can also be introduced into the space below the engine cavity and under the floor of the vehicle. The gas used here is preferably helium, hydrogen, xenon or sulfahexafluoride, but other gases or gas mixtures can also be used. Helium, for example, has a higher speed of sound than air by a factor of three, and the speed of sound in xenon and sulfahexafluoride is on the other hand lower than that of air. By flooding the engine compartment with one of these gases, the acoustic conditions change, i.e., the modes shift to higher frequencies in helium and to lower frequencies in xenon and sulfahexafluoride. Here, the airborne sound emitted by the drive train is modified to a very great extent, which can also be picked up by measuring equipment in the interior of the vehicle. In the case of helium, for example, the sound pressure is as a rule lower at low frequencies. However, the sound pressure can also rise at medium and high frequencies.

If it is to be qualitatively decided whether the engine noise in the interior of the vehicle is also influenced by the airborne portion of the engine noise at a specific frequency, or is mainly made up of the solid-borne portion, at least one microphone is installed in the interior of the vehicle to measure the sound, and the sound signals are transmitted to an evaluation unit and analyzed there (this is assumed in the text which follows and is no longer mentioned separately). If significant changes in sound pressure are measured in the interior of the vehicle when there is a given load state and rotational speed and a specific frequency, or averaged or cumulated over all frequencies, after the gas or gas mixture has been introduced into the engine compartment, it is possible to infer therefrom that the airborne portion of the engine noise is predominant in the engine noise in the interior of the vehicle. If only slight changes, or no changes at all, can be detected in the sound pressure measured in the interior of the vehicle, it is possible to assume that the solid-borne sound induced in the vehicle by the engine is dominant.

For a more precise, quantitative analysis, the airborne sound in the engine compartment is additionally measured at one or more characteristic points and measured in the interior of the vehicle, using one or more microphones, before, during and after the flooding with gas. To control the phase and the engine speed, the rotational speed signal or the acceleration of the engine block can also be measured. The average rotational speed also can easily be determined from the sound pressure measured in the interior of the vehicle or in the engine compartment. The corresponding analytical techniques are known.

Through the rise and fall of the sound pressure levels in the engine compartment and in the interior of the vehicle after and during the flooding with gas it is possible to calculate the solid-borne sound portion and the airborne sound portion in the interior of the vehicle for the individual frequencies.

One possible way of calculation is discussed below. It is assumed that an internal combustion engine is run up in the declutched state when the vehicle is stationary (i.e., no rolling or wind noises). At a specific engine operating point and a selected frequency, the overall sound pressure level $L_{ges}$, made up of the airborne sound portion $L_L$ and the solid-borne sound portion $L_K$ of the engine noise, is measured in the interior of the vehicle. Assuming uncorrelated sound pressure signals (i.e., there is no fixed phase relation between the sound in the engine compartment and in the interior of the vehicle), the overall sound pressure $L_{ges}$ in the interior of the vehicle follows from the summing of the energy of the sound pressures of the airborne sound portion and the solid-borne sound portion which is applied when there are uncorrelated sound pressure portions (cf. H. Klingenberg, Automobil-Me β technik [Automobile Measuring Technology], Vol. A: Akustik [Acoustics], Springer-Verlag 1988, p. 13). Here, the two individual levels of the airborne sound $L_L$ and of the solid-borne sound $L_K$ are summed as follows (i.e., here n=2):

$$L_{ges} = 10 \lg\left(10^{\frac{L_L}{10}} + 10^{\frac{L_K}{10}}\right) \tag{I}$$

In the engine compartment, the airborne sound pressure level $L_M$ is measured in the initial state. After the flooding with gas, a sound pressure level, which is lower by $\Delta L_M$ is measured in the engine compartment. It is to be ensured, beforehand, that the microphone is also appropriately standardized in the gas or gas mixture or in air (if appropriate, a special microphone is used). Assuming that there is a linear sound pressure transmission to the interior of the vehicle, the airborne sound portion of the engine noise in the interior of the vehicle also decreases by $\Delta L_L = \Delta L_M$, which is assumed in the following calculation. If the linearity of the airborne sound transmission were not to apply, a corresponding correction function is to be determined and is to be taken into account in the determination of $\Delta L_L$ from $\Delta L_M$ and the transmission function is to be determined in both states, i.e., before and after the flooding of the engine compartment with gas. Here, it is appropriate to carry out a reciprocal measurement (sound excitation in the interior of the vehicle and measurement of the sound signal in the engine compartment). In addition, it is to be assumed that the flooding with gas does not influence the emitted solid-borne sound of the engine or the solid-borne transmission into the interior of the vehicle, i.e., $L_K$ remains unchanged before and after the flooding with gas. The following formula describes the state in the interior of the vehicle after the flooding with gas:

$$L_{ges} - \Delta L_{ges} = 10 \lg\left(10^{\frac{L_L - \Delta L}{10}} + 10^{\frac{L_K}{10}}\right) \tag{II}$$

The airborne sound pressure level of the engine noise in the vehicle compartment is obtained, after the conversion of the equation, as:

$$L_L = 10 \lg\left(10^{\frac{L_{ges}}{10}} \frac{1 - 10^{\frac{-\Delta L_{ges}}{10}}}{1 - 10^{\frac{-\Delta L_L}{10}}}\right) \tag{III}$$

and the solid-borne sound level of the engine noise in the interior of the vehicle is consequently:

$$L_K = 10 \lg\left(10^{\frac{L_{ges}}{10}} - 10^{\frac{L_L}{10}}\right) \tag{IV}$$

A short example for illustrative purposes: the overall sound pressure level in the interior of the vehicle is assumed to be 90 dB at a specific frequency $L_{ges}$. After the flooding with gas, the sound pressure level in the engine compartment decreases at the abovementioned frequency by $\Delta L_L = \Delta L_M = 10$ dB, while in the interior of the vehicle the sound pressure level decreases by 2 dB. With the abovementioned formulas, the airborne sound pressure level $L_L$ is consequently 86.1 dB and the solid-borne sound pressure level $L_K$ is 87.7 dB. The levels and the sound pressures or sound output can also be measured in relation to one another to obtain relative data. Analogous calculations can also be carried out for correlated signals taking into account the phases of the sound pressure in the engine compartment and in the interior of the vehicle. The precision of the measuring method can be increased further by using a plurality of microphones in the interior of the vehicle (for example, at the ear positions of the individual passengers on the front seats and rear seats) and/or engine compartment. Another possible way of increasing the precision of the measuring method is to measure the sound pressure level at a constant operating point, while the gas or gas mixture is introduced into the engine compartment, and to measure it at different gas concentrations, and then compare the measured values.

In another advantageous refinement, not only the engine compartment itself but also the space between the engine compartment and the road or else the entire space under the vehicle or around the vehicle is filled with gas or gas mixture.

In one refinement for measuring the solid-borne portion and the airborne portion of the noise in the interior of the vehicle, the engine compartment is either sealed off or packed in a gas-tight fashion with a tarpaulin, and the gas or gas mixture is then introduced into the resulting closed-off cavity.

In a further preferred refinement, the gas or gas mixture is introduced into the engine compartment together with a foam or as an aerosol. The foam serves here as a carrier for the gas so that the gas cannot escape from the engine compartment as easily. In addition, this measure increases the damping of the airborne sound.

In a further preferred refinement, the gas or gas mixture is introduced into bags composed of a thin film and placed in the engine compartment. The "gas bags" may, for practical reasons, also be filled with the gas after they have been placed in the engine compartment, through valves provided for that purpose. In addition to the gas, additional absorbent materials (foam, fabric, foam balls, wool or the like) can also be placed in the gas bags to increase the damping of sound.

In a further advantageous refinement, the vehicle is placed in an enclosed space. This space may be a test chamber or else a gas-tight film tent, a gas-tight enclosure or a similar, closed-off volume. The sealing of the engine space, which is possibly necessary to prevent the loss of gases, is thus eliminated. It is also possible to suck out the gas or gas mixture again and re-use it after the termination of the tests.

A further advantageous refinement is obtained when additional cavity bulkheads are used. Here, free regions in the engine compartment are separated off, for example, by metal sheets, plastic panels, reverberating films or the like. Thus, additional tuning of the engine space modes is obtained.

A further refinement provides for absorbent materials to be used in the engine compartment. For this purpose, resonators, damping wedges, foam elements, damping foils or the like are introduced in the engine compartment. In this way, the airborne sound damping is also increased. By introducing the gas or gas mixture into the engine compartment, the irradiation of airborne sound into the exterior is also changed. In this way, it is possible in the manner described above to determine the engine airborne sound portion of the overall external noise for various load states, for example on a vehicle dynamometer test facility.

Furthermore, the invention provides a device which is suitable for carrying out the methods described above. This device may be, for example, a measuring space, a test chamber or the like.

The above advantages and other advantages, objects, and features of the present invention will be readily apparent from the following detailed description of the preferred embodiments when taken in connection with the accompanying drawings.

BRIEF DESCRIPTION OF DRAWINGS

The invention is explained in more detail by way of example with reference to the figures, in which.

The following designations are used in the FIGS.: 1: vehicle; 2: interior of the vehicle; 3: engine compartment; 4: engine; 5: film; 6, 6': microphones; 7: gas cylinder; 8: hose; 9: gas; 10: gas foam; 11: film bag; 12: exterior space.

DETAILED DESCRIPTION

Figure 1:
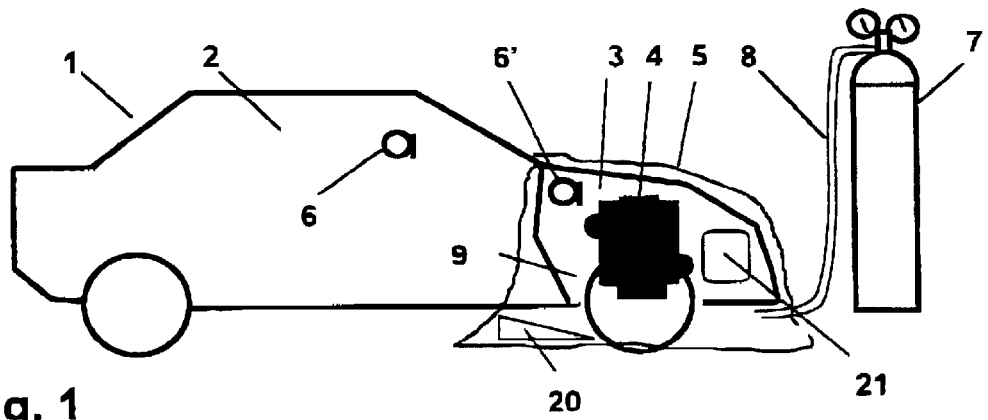
FIG. 1 is a schematic representation of a basic form of the measuring setup.

The basic set up for a measurement with a vehicle 1 with engine 4 is illustrated in FIG. 1. Microphones 6 and 6' are installed in the interior 2 of the vehicle and in the engine compartment 3. The sound in the engine compartment 3 and in the interior 2 of the vehicle is measured using these microphones 6, 6'. The engine compartment 3 of the vehicle 1 is to be sealed off for the measurement (in particular, the gaps and openings at the engine hood, at the radiator grill, with respect to the side doors and the wheel housings and with respect to the interior 2 of the vehicle) so that the gas 9 cannot escape after being introduced. If helium is used as the gas 9, it rises in the engine compartment 3, i.e. there is no need for it to be sealed off in the downward direction from the underlying surface. However, it is favorable if the region between the vehicle 1 and the underlying surface (not illustrated) is sealed off by a film 5 or the like, and filling with gas or helium as far as the surface of the carriage way is thus ensured. It is also appropriate to flood the entire space under the bottom of the vehicle as far as the underlying surface with gas 9 so that the air modes under the vehicle 1 are thus also tuned. This is appropriate in particular at low frequencies where the wavelengths are in the approximate order of magnitude of the width or length of the vehicle. Film is also appropriate for sealing. The gas is introduced simply though a hose 8 from a gas cylinder 7. The gas 9, which is helium by example, is lighter than air, and for this reason, when gas 9 is used, the hose 8 can be placed on the ground under the engine compartment 3 and the gas 9 can be allowed to flow out. As gases 9 such as helium are, however, easily mixed with air, it is in certain circumstances also appropriate to allow gas 9—as far as it is lighter than air—to flow out in the upper part of engine compartment 3 so that it gradually expels the air from engine compartment 3 and there is thus less mixing. The gas concentration in engine compartment 3 and in interior 2 of the vehicle can—if it is necessary for the later evaluation—be determined by commercially available sensors (for example ultrasonic sensors). The measurement can also be carried out in the open air for running up engine 4 in the "neutral" gear position. Full-load measurements with gas flooding are appropriately carried out on an acoustic vehicle roller test bench. Alternatively, the position of the gas pedal or throttle valve can also be controlled externally. A further possibility is to place interior 2 of the vehicle under a low excess pressure by additional ventilation so that no gas 9 can penetrate it. To amplify the mode tuning by the flooding with gas even more, thin, reverberating bulkhead walls (for example made of plastic or the like, nat shown) can additionally be introduced into the engine compartment 3. Gas can similarly be introduced into the trunk, sills and other cavities, and also be used to determine the airborne sound portion and the solid-borne sound portion. During the measurement, under certain circumstances, preventive measures are to be taken to ensure that engine 4 sucks in air and no gas 9 with its intake system. The airborne sound damping can be significantly improved, in particular in the medium and relatively high frequency ranges, by additionally introducing absorbent material 21, resonators or damping wedges 20 into or under engine compartment 3.

Figure 2:
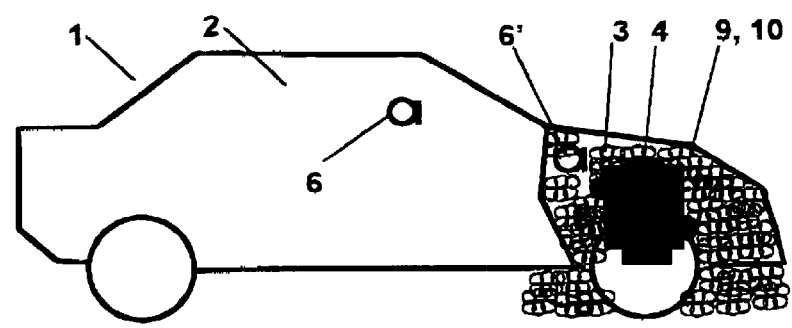
FIG. 2 is a schematic representation of a measurement with gas foam.

In FIG. 2, gas foam 10 is introduced into engine compartment 3 instead of flooding it with gas 9. As result, significantly increased acoustic damping of the airborne sound emitted by engine 4 is additionally achieved. Furthermore, mixing of gas 9 with the air in engine compartment 3 is virtually prevented. The sealing of engine compartment 3 can also be dispensed with under certain circumstances. A small cavity around microphone 6' is to be provided so that, nevertheless, the sound pressure can be measured at one characteristic location.

Figure 3:
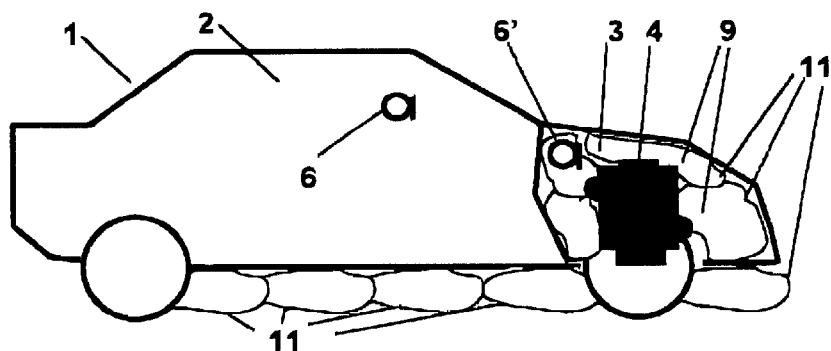
FIG. 3 is a schematic representation of a measurement with gas bags.

In FIG. 3, film bags 11 which are filled with gas 9 are introduced into engine compartment 3. The gas-tight film bags 11 should as far as possible not crackle or emit any noise and should be noncombustible and relatively resistant to tearing. The film itself can also be of a damping type. A further possibility is for film bags 11 also to be additionally filled with a damping filler (fabric, foam balls, wool, or the like). The size and shape of film bags 11 is to be selected in such a way that they can easily be introduced into and under engine compartment 3, thus filling up the latter as successively as possible. The film bags 11 can also be equipped with a valve so that gas 9 can also be introduced when film bags 11 have already been placed in engine compartment 3. Film bags 11 can also be additionally placed under vehicle 1 so that the acoustic mode field under vehicle 1 is also tuned.

Figure 4:
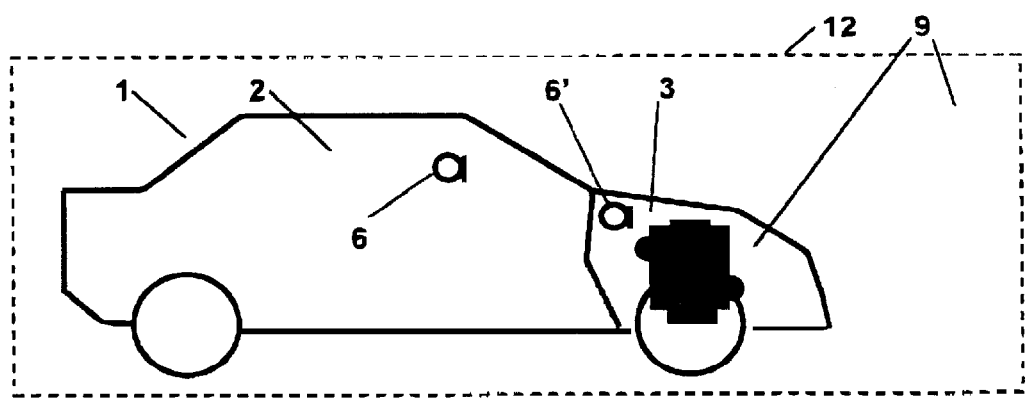
FIG. 4 is a schematic representation of a measurement with flooding of the exterior space.

In FIG. 4, instead of engine compartment 3, the entire exterior 12 around vehicle 1 is flooded with gas 9. As a result, the expenditure on sealing engine compartment 3 is avoided. If a corresponding measuring space is set up, the gas can be sucked out again after the measurement and re-used for the next measurement. Alternatively, a gas-tight enclosure made of plastic film, etc., can also be placed over the vehicle, or the vehicle can be placed in a film tent. For gases, which are heavier than air, it is also possible to use a gas-tight (film) trough.

While several modes for carrying out the invention have been described in detail, those familiar with the art to which this invention relates will recognize alternative designs and embodiments for practicing the invention. The above-described embodiments are intended to be illustrative of the invention, which may be modified within the scope of the following claims.

I claim:

1. A method for determining a solid-borne portion and an airborne portion of engine noise in the interior of a vehicle, comprising:

performing a first sound measurement by at least one microphone in an engine compartment and in the interior of the vehicle, the microphones being connected to at least one amplifier and evaluation unit;

introducing a gas other than air into said engine compartment of the vehicle;

performing a second sound measurement when said gas is in said engine compartment; and comparing said first and second sound measurements.

2. The method of claim 1 wherein said gas has a density substantially different than a density of air.

3. The method of claim 2 wherein said gas is a mixture of gases.

4. The method of claim 2 wherein said gas is substantially pure.

5. The method of claim 1 wherein said gas substantially replaces air within one of said engine compartment, underneath the vehicle, and both said engine compartment and underneath the vehicle.

6. The method of claim 1 wherein said gas is prevented from escaping by a gas-tight film.

7. The method of claim 1 wherein said gas is prevented from escaping by a gas-tight sealing of the engine compartment.

8. The method of claim 1 wherein said gas is a gas-containing foam.

9. The method of claim 1 wherein said gas is introduced into said engine compartment in bags filled with said gas.

10. The method of claim 1 wherein an exterior space surrounds the vehicle, the method further comprising flooding said exterior space with said gas.

11. The method of claim 1 wherein a gas-tight enclosure surrounds the vehicle, the method further comprising flooding said gas-tight enclosure with said gas.

12. The method of claim 1, further comprising adding at least one of: metal sheets, plastic panels, and reverberating films into said engine compartment.

13. The method of claim 1, further comprising adding at least one of: additional absorbent materials, and damping wedges into said engine compartment.

14. A system for determining a solid-borne portion and an airborne portion of powerplant noise for a powerplant disposed in a vehicle, comprising:

at least one microphone located in a powerplant compartment for measuring sound;

at least one microphone located in an interior of the vehicle;

means for collecting data from said microphones, wherein said data collection occurs a first time under conditions with air in and around the vehicle and a second time under conditions with a gas other than air in and around the vehicle.

15. The system of claim 14 wherein said means comprises a data acquisition system and a computer.

16. The system of claim 14 wherein said gas has a density substantially different than that of air.

17. The system of claim 14 wherein said gas is a mixture of gases.

18. The system of claim 14 wherein said gas contains at least one of: hydrogen, helium, xenon, and sulfahexafluoride.

19. The system of claim 14, further comprising: a gas-tight film for preventing escape of the gas in and around the vehicle.

20. The system of claim 19 wherein said gas is flooded into said gas-tight film.

21. The system of claim 14, further comprising a gas-containing foam to be placed in the powerplant compartment.

22. The system of claim 14, further comprising gas-tight sealing of said powerplant compartment.

23. The system of claim 14, further comprising at least one of the following included in said powerplant compartment:
- metal sheets;
- plastic panels; and
- reverberating films.

24. The system of claim 14 wherein said powerplant is an internal combustion engine.

25. The system of claim 14 wherein said powerplant is an electric motor.

26. The system of claim 14 wherein said powerplant comprises an internal combustion engine and an electric motor.

27. The system of claim 14 wherein said microphones are coupled to at least one amplifier and evaluation unit.

28. The system of claim 14 wherein said means comprises at least one amplifier and evaluation unit.

29. The method of claim 1, further comprising adding at least one of additional absorption materials and damping wedges under said engine compartment.

* * * * *